United States Patent [19]

Morris et al.

[11] Patent Number: 5,237,038

[45] Date of Patent: Aug. 17, 1993

[54] POLYESTERS FROM TEREPHTHALIC ACID, 2,6-NAPHTHALENEDICARBOXYLIC ACID, HYDROQUINONE AND 4,4'-BIPHENOL

[75] Inventors: John C. Morris; Winston J. Jackson, Jr., both of Kingsport, Tenn.

[73] Assignee: Eastman Kodak Company, Rochester, N.Y.

[21] Appl. No.: 615,743

[22] Filed: Nov. 16, 1990

[51] Int. Cl.$^5$ .................. C08G 64/00; C08G 63/00; C08F 20/00

[52] U.S. Cl. ........................ 528/194; 524/599; 524/601; 524/605; 525/437; 525/444; 528/176; 528/190; 528/193; 528/272

[58] Field of Search .............. 528/176, 190, 193, 194, 528/272; 525/437, 444; 524/599, 601, 605

[56] References Cited

U.S. PATENT DOCUMENTS

| | | | |
|---|---|---|---|
| 3,030,335 | 4/1962 | Goldberg | 528/272 |
| 3,036,990 | 5/1962 | Kantor et al. | 528/272 |
| 3,160,604 | 12/1964 | Holub et al. | 528/272 |
| 3,637,595 | 1/1972 | Cottis et al. | 528/272 |
| 4,146,702 | 3/1979 | Morris et al. | 528/191 |
| 4,156,070 | 5/1979 | Jackson, Jr. et al. | 528/191 |
| 4,169,933 | 10/1979 | Jackson, Jr. et al. | 528/190 |
| 4,181,792 | 1/1980 | Jackson, Jr. et al. | 528/190 |
| 4,184,996 | 1/1980 | Calundann | 528/272 |
| 4,201,856 | 5/1980 | Jackson, Jr. et al. | 528/272 |
| 4,849,499 | 7/1989 | Fagerburg et al. | 528/298 |
| 5,025,082 | 6/1991 | Kishiro et al. | 528/190 |

FOREIGN PATENT DOCUMENTS

| | | |
|---|---|---|
| 0133024 | 2/1985 | European Pat. Off. . |
| 0356226 | 2/1990 | European Pat. Off. . |
| 0366846 | 5/1990 | European Pat. Off. . |
| 7900797 | 10/1979 | PCT Int'l Appl. . |

*Primary Examiner*—John Kight, III
*Assistant Examiner*—T. Mosley
*Attorney, Agent, or Firm*—Mark A. Montgomery; William P. Heath, Jr.

[57] ABSTRACT

Disclosed are melt-processable wholly aromatic polyesters prepared from terephthalic acid, 2,6-naphthalenedicarboxylic acid, hydroquinone and 4,4'-biphenol.

18 Claims, No Drawings

POLYESTERS FROM TEREPHTHALIC ACID, 2,6-NAPHTHALENEDICARBOXYLIC ACID, HYDROQUINONE AND 4,4'-BIPHENOL

FIELD OF THE INVENTION

The present invention relates to the preparation of high molecular weight melt-processable aromatic polyesters based on terephthalic acid, 2,6-naphthalenedicarboxylic acid, hydroquinone and 4,4'-biphenol that have excellent physical properties. The present invention more particularly relates to melt processable thermotropic liquid crystalline wholly aromatic polyesters based on unsubstituted terephthalic acid, 2,6-naphthalenedicarboxylic acid, hydroquinone and 4,4'-biphenol.

BACKGROUND OF THE INVENTION

Liquid crystalline polyesters prepared from many different monomers are disclosed in the prior art. U.S. Pat. No. 3,036,990 discloses fully aromatic polyesters prepared from hydroquinone, isophthalic acid, and terephthalic acid. U.S. Pat. No. 4,849,499 discloses liquid crystal copolyesters prepared from terephthalic acid, 2,6-naphthalenedicarboxylic acid, a diacyl ester of 4,4-biphenol and p-acyloxybenzoic acid and contains certain divalent radicals.

Prior to the present invention melt-processable all-aromatic liquid crystalline polyesters required either a hydroxy acid (unsymmetrical by nature because the two reactive groups are different), a substituted aromatic dicarboxylic acid or diol, or a kinking component, e.g., isophthalic acid or oxydibenzoic acid, in order to lower high melting points.

The solution to the problem of highly aromatic liquid crystal polyesters having a melting point so high that the polyester could not be melt processed in conventional equipment was to lower the melting point to an acceptable level by either using a substituted aromatic diol or dicarboxylic acid such as phenyl-, bromo- or chlorohydroquinone, or chloroterephthalic acid; a kinked structure such as a isopropylidene, sulfone, or keto linkage between the aromatic rings; or a meta directed or substituted aromatic dicarboxylic acid or diol, such as isophthalic acid or resorcinol; and/or a hydroxy acid monomer, such as p-hydroxybenzoic acid or 2-hydroxy-6-naphthoic acid. While these approaches were effective in lowering the melting point of the polymer, the polyesters of the prior art have reduced solvent resistance, heat resistance, oxidative stability and thermal stability compared to the polyesters of the present invention due to the presence of the substituents or the kinks or the hydroxy acid components.

In light of the above it would be very beneficial to be able to produce wholly aromatic melt-processable liquid crystal polyesters having the desirable combination of heat resistance, solvent resistance, and exceptional oxidative and thermal stability.

SUMMARY OF THE INVENTION

The melt-processable wholly aromatic polyesters of the present invention are prepared from symmetrical, unsubstituted terephthalic acid, 2,6.naphthalenedicarboxylic acid, hydroquinone and 4,4'-biphenol.

The wholly aromatic unsubstituted polyesters of the present invention comprise:

(A) an acid component comprising repeating units of about 20 to 90 mol percent of terephthalic acid and about 80 to 10 mol percent 2,6-naphthalenedicarboxylic acid, and (B) an aromatic diol component comprising repeating units of about 10 to 90 mol percent hydroquinone and about 90 to 10 mol percent 4,4'-biphenol, wherein the total mol percent of acid component and aromatic diol component are each 100 mol percent; said polyester having a melting point below about 450° C.

DETAILED DESCRIPTION OF THE INVENTION

The wholly aromatic polyesters of the present invention are melt-processable but yet have exceptional thermal stability, high tensile and flexural strength, superior solvent resistance, and extraordinary heat resistance. The melt-processable wholly aromatic polyesters of the present invention avoid the need for a substituted, kinked, meta-directed or hydroxyacid component structure of the melt-processable wholly aromatic polyesters of the prior art. We have found a range of thermotropic melt processable polyesters based on terephthalic acid, 2,6-naphthalenedicarboxylic acid, hydroquinone and 4,4'-biphenol which can be prepared in the melt.

By unsubstituted it is meant that there are no alkyl, aryl, or halogen substituents on the aromatic rings of the aromatic dicarboxylic acids or the aromatic diols. The reaction conditions for melt polymerization of the polyesters of the present invention are preferably in the range of 200°–400° C., more preferably in the range of 300°–400° C. A combination of processes may also be used to synthesize the polyesters of the present invention such as solid state polymerization of low molecular weight prepolymer prepared in the melt.

The polyesters of the present invention generally comprise between about 20 and 90 mol percent terephthalic acid units, between about 80 and 10 mol percent naphthalenedicarboxylic acid units, between about 10 and 90 mol percent hydroquinone units, and between about 90 and 10 mol percent 4,4'-biphenol units. The preferred range of monomeric units are such that the composition melts at less than 400° C. and comprises terephthalic acid units, 2,6-naphthalenedicarboxylic acid units, 4,4'-biphenol units, and hydroquinone units such that the melting point of the polyester satisfies the following equation:

$$1 \; DSC \; (Tm, °C.) = 332.25 - 1.667(T') - 13.000(HQ') + 34.375(T')^2 + 66.0025(HQ')^2$$

where $T' = (T \text{ content in mols} - 55)/35$,
$HQ' = (HQ \text{ content in mols} - 50)/40$,
$T =$ terephthalic acid, and $HQ =$ hydroquinone.
and having a coefficient of determination ($R^2$) of 93% and a standard deviation of 13.4.

The 2,6-naphthalenedicarboxylic acid content is then equal to 100 minus the mol% terephthalic acid content and the biphenol content of the polyesters is equal to the 100 minus the hydroquinone content used in equation (1).

An excess of hydroquinone ester may be used in the synthesis of the polyesters of the present invention such that the excess in mols meets the following equation:

$$2 \; \text{Excess HQ} = 5.84 + 4.0167(T') + 8.2125(HQ') - 3.825(T')(HQ') - 6.0025(HQ')$$

where $T' = (T \text{ content in mols} - 55)/35$,
$HQ' = (HQ \text{ content in mols} - 50)/40$, T=mol% terephthalic acid, and HQ=mol% hydroquinone.

and having a coefficient of determination (R²) of 90% and a standard deviation of 3.3.

The polyesters of the present invention preferably comprise between about 80 to 20 mol percent terephthalic acid units, 20–80 mol percent 2,6-naphthalenedicarboxylic acid units, 80–20 mol percent hydroquinone units, and 20–80 mol percent 4,4'-biphenol units. The polyesters of the present invention more preferably comprise about 70 to 40 mol percent terephthalic acid units, 30 to 60 mol percent 2,6-naphthalenedicarboxylic acid units, and about 70–30 mol percent hydroquinone units, and about 30–70 mol percent 4,4'-biphenol units.

Molded bars of the wholly aromatic polyester of the present invention are unaffected after exposure for 24 hours in a variety of solvents which include toluene, 1,2-dichloroethane, methyl isobutyl ketone, ethyl acetate, ethanol, water, sulfuric acid, 10% sodium hydroxide, gasoline, acetone, acetic acid, 5% chlorox bleach, 50/50 water/ethanol, benzyl alcohol, nitric acid and methylene chloride.

The polyesters of the present invention have a melting point below about 450° C. However, it is preferred that these polyesters have a melting point below about 400° C.

The polyesters of this invention are prepared from terephthalic acid, 2,6-naphthalenedicarboxylic acid and preferably an acyl ester of hydroquinone and an acyl ester of 4,4'-biphenol. Examples of suitable acyl esters include the diacetate, dipropionate, dibenzoate and the like.

The dicarboxylic acid portion of these polyesters may be substituted with up to 10 mol %, but preferably, less than 5 mol % of other aromatic dicarboxylic acids. Examples of suitable aromatic dicarboxylic acids include isophthalic, 4,4'-biphenyldicarboxylic, 1,5-, 2,6-, 2,7-naphthalenedicarboxylic, 4,4'-oxydibenzoic acid or trans-4,4,-stilbenedicarboxylic acids.

The aromatic diol portion of these polymers may contain up to 10 mol %, but preferably less than 5 mol of another aromatic diol. Examples of suitable aromatic diols include bisphenol A, 4,4'-dihydroxydiphenylsulfone, 2-methylhydroquinone, 2-chlorohydroquinone, 2-(phenylethyl)hydroquinone, 2-phenylhydroquinone, and 2-cyclohexylhydroquinone as well as the dihydroxy compounds which are disclosed in U.S. Pat. Nos 3,030,335 and 3,317,466. It is preferred that all monomers used in the polyesters of the present invention be completely unsubstituted monomers.

The composition of the present invention also preferably comprises:

(i) about 5 to 95 wt. % of the wholly aromatic polyester, more preferably about 10 to 90 wt. % and
(ii) about 95 to 5 wt. % of at least one property modifier more preferably about 90 to 10 wt. %.

The property modifiers of (ii) include for example: 6,6-nylon, nylon-6, poly(ether-imides) such as ULTEM from General Electric, polyphenylene oxides such as poly(2,6-dimethyl-phenylene oxide), polyphenylene oxide/polystyrene blends such as the NORYL resin from General Electric, a different polyester, polyphenylene sulfides, polyphenylene sulfide/sulfone blends, poly(ester-carbonates), polycarbonates such as LEXAN from General Electric, polysulfones, polysulfone ethers, poly(ether-ketones), phosphorus compounds, halogen compounds, halogen compounds in combination with an antimony compound, talc, mica, glass fibers, or carbon fibers.

In addition to melt preparation, the polyesters of the present invention can be prepared by the following process:

(a) mixing, under polymerization conditions
  (A) an acid component comprising about 35 to 60 mol percent terephthalic acid and 65 to 40 mol percent 2,6-naphthalenedicarboxylic acid, and
  (B) an aromatic diol component comprising repeating units of about 10 to 90 mol percent hydroquinone and about 90 to 10 mol percent 4,4'-biphenol thereby producing a polyester, said polyester having a melting point below about 450° C., wherein the total mol percent of acid component and aromatic diol component are each 100 mol percent;

(b) grinding or pelletizing the polyester;
(c) heating the particulate polyester of (b) under partial vacuum or nitrogen purge to further remove the reaction by-products to further increase the molecular weight of the polyester.

Steps (a) and (c) are preferably conducted at about to 400° C., more preferably at about 300° to 400° C. with about 340° to 380° C. being most preferred.

It is preferred that the wholly aromatic polyester of the present invention is in the form of a molded object such as a container or part or an extruded object such as a fiber or film.

EXAMPLES

The following examples are to illustrate the present invention but should not be interpreted as a limitation thereon.

The melting points of the copolymers are determined using a Perkin-Elmer DSC 2B Differential Scanning Calorimeter at a scan rate of 20 ° C/min. The melting points were also confirmed using a Fischer-Johns melting point apparatus. The acid content of the compositions is determined by basic alcoholic hydrolysis of the polymers and subsequent analysis by proton nuclear magnetic resonance spectroscopy (NMR) and by gas chromatography analysis of the hydrolyzed product.

The polymers are dried at 80°–100° C. in a vacuum oven for 24 hours, and injection-molded on a Boy 22S molding machine or a 1-ounce Watson-Stillman molding machine to give 1/16-inch thick D1822 Type L tensile bars and $\frac{1}{8} \times \frac{1}{2} \times 5$-inch flexure bars. The tensile strength is determined following the procedure of ASTM D638.

EXAMPLE 1

This example illustrates the preparation of the homopolyester consisting of 55 mol % terephthalic acid units, 45 mol % 2,6-naphthalenedicarboxylic acid units, 50 mol % hydroquinone units, and 50 mol % 4,4,-biphenol units.

A mixture of 6.4 g (0.0385 mol) terephthalic acid, 6.8 g (0.0315 mol) 2,6-naphthalenedicarboxylic acid, and 7.8 g (0.0350 mol) hydroquinone dipropionate, and 9.5 g (0.0350 mol) 4,4'-biphenol diacetate was placed in a 100-ml flask equipped with an inlet for nitrogen, a metal stirrer, and a short distillation column. The flask was then placed in a Wood's metal bath already heated to 300° C. and the contents of the flask were heated at 300° C. for about 20 minutes. The temperature was then raised progressively to 310° C., 330° C., 375° C., and then on to 400°–415° C. over the next 15 minutes. A vacuum of 0.5 mm was gradually applied over the next 3-5 minutes. Full vacuum was maintained for about 20 minutes. A high melt viscosity, opaque, tan, crystalline polymer was obtained with melting endotherms measured by DSC at 306° C., 322° C., and 345° C.

The polymer was ground to pass a 3-mm screen, dried and solid state polymerized by heating 30 minutes at 110° C. and then for 3 hours at 300° C. The polymer now has melting endotherms of 322° C. and 347° C. The polymer melts and flows on a Fischer-Johns melting point apparatus at about 322° C.

The remaining polyesters in the table below were prepared and injection-molded in a manner essentially identical to the above.

TABLE 1

Melting Points of T(NA)(HQ)(BP)[a] Polyesters[b]

| T Content, mol % | NA Content, mol % | HQ Content, mol % | BP Content, mol % | Melting Temp., °C.[c] |
|---|---|---|---|---|
| 90 | 10 | 90 | 10 | 418 |
| 90 | 10 | 50 | 50 | 372 |
| 90 | 10 | 10 | 90 | 437 |
| 55 | 45 | 90 | 10 | 392 |
| 55 | 45 | 50 | 50 | 322 |
| 55 | 45 | 50 | 50 | 328 |
| 55 | 45 | 10 | 90 | 316 |
| 20 | 80 | 90 | 10 | 400 |
| 20 | 80 | 50 | 50 | 386 |
| 20 | 80 | 10 | 90 | 451 |

[a]T = terephthalic acid, NA = 2,6-naphthalenedicarboxylic acid, HQ = hydroquinone, BP = 4,4,-biphenol
[b]The composition of the polyesters has an accuracy of +/−5 mol %.
[c]The melting points were determined by differential scanning calorimetry and confirmed on a Fischer-Johns melting point apparatus.

The above table illustrates that a broad range of wholly aromatic liquid crystalline all-aromatic polyesters can be prepared from the unsubstituted symmetrical monomers of our invention.

We claim:

1. A wholly aromatic unsubstituted polyester comprising:
   (A) An acid component consisting essentially of repeating units of about 20 to 90 mol % of terephthalic acid, about 80 to 10 mol % 2,6-naphthalenedicarboxylic acid, and 0 up to 10 mol % of one other aromatic dicarboxylic acid; and
   (B) an aromatic diol component consisting essentially of repeating units of about 10 to 90 mol % hydroquinone, about 90 to 10 mol % p4,4'-biphenol, and 0 up to 10 mol % of one other aromatic diol wherein the total mol percent of acid component and aromatic diol component are each 100 mol percent; said polyester having a melting point below about 450° C.

2. The polyester of claim 1 wherein the concentration range of the monomeric units is such that the melting point of the polyester satisfies the following equation:

DSC (Tm, °C.)=332.25−1.667(T')−13.000(HQ')+34.375(T')2+66.0025(HQ')2 where T'=(T content in mols −55)/35,
HQ'=(HQ content in mols −50)/40,
T=terephthalic acid, and HQ= hydroquinone.

3. The polyester of claim 1 wherein said acid component comprises repeating units of about 80 to 20 mol percent terephthalic acid, and about 20 to 80 mol percent 2,6-naphthalenedicarboxylic acid, and said aromatic diol component comprises repeating units of about 80 to 20 mol percent hydroquinone and about 20 to 80 mol percent 4,4'-biphenol.

4. The polyester of claim 3 wherein said acid component comprises repeating units of about 70 to 40 mol percent terephthalic acid, and about 30 to 60 mol percent 2,6-naphthalenedicarboxylic acid, and said aromatic diol component comprises repeating units of about 70 to 30 mol percent hydroquinone and about 30 to 70 mol percent 4,4'-biphenol.

5. The polyester of claim 1 wherein said acid component and said aromatic diol component are symmetrical.

6. The polyester of claim 1 wherein said acid component comprises up to 10 mol percent of at least one other aromatic dicarboxylic acid.

7. The polyester of claim 6 wherein said acid component contains up to 5 mol percent of at least one other aromatic dicarboxylic acid selected from the group consisting of isophthalic acid, 4,4'-biphenyldicarboxylic acid, 1,5-naphthalenedicarboxylic acid, 2,6-naphthalenedicarboxylic acid, 2,7-naphthalenedicarboxylic acid, 4,4'-oxydibenzoic acid, and trans-4,4'-stilbenedicarboxylic acid.

8. The polyester of claim 1 wherein said aromatic diol component contains up to 10 mole percent of at least one other aromatic diol.

9. The polyester according to claim 8 wherein said aromatic diol component contains up to 5 mole percent of at least one other aromatic diol.

10. The polyester according to claim 9 wherein said other aromatic diol is selected from the group consisting of: bisphenol A, 4,4'-dihydroxydiphenylsulfone, 2-methylhydroquinone, 2-chlorohydroquinone, 2-(phenylethyl)hydroquinone, 2-phenylhydroquinone, and 2-cyclohexylhydroquinone.

11. A composition comprising:
   (i) about 5 to 95 wt. % of the polyester of claim 1, and
   (ii) about 95 to 5 wt. % of at least one property modifier.

12. The composition of claim 11 wherein component (i) is present in an amount of about 10 to about 90 weight percent, and component (ii) is present in an amount of about 90 to about 10 weight percent.

13. The composition of claim 11 wherein said property modifier is 6,6-nylon, nylon-6, a poly(etherimide), a polyphenylene oxide, a polyphenylene oxide/polystyrene blend, a different polyester, a polyphenylene sulfide, a polyphenylene sulfide/sulfone blend, a poly(ester-carbonate), a polycarbonate, a polysulfone ether, a poly(ether-ketone), a phosphorus compound, a halogen compound, a halogen compound in combination with an antimony compound, talc, mica, a glass fiber, or a carbon fiber.

14. A molded plastic comprising the polyester of claim 1.

15. An extruded plastic comprising the polyester of claim 1.

16. A fiber comprising the polyester of claim 1.

17. A film comprising the polyester of claim 1.

18. A wholly aromatic unsubstituted polyester comprising:
   (A) An acid component consisting essentially of repeating units of about 20 to 90 mol percent of terephalic acid and about 80 to 10 mol percent 2,6-naphthalenedicarboxylic acid, together both being at least 90 mol percent of the acid component; and
   (B) an aromatic diol component consisting essentially of repeating units of about 10 to 90 mol percent hydroquinone and about 90 to 10 mol percent 4,4'-biphenol, together both being at least 90 mol percent of the aromatic diol component
   wherein the total mol percent of acid component and aromatic diol component are each 100 mol percent; said polyester having a melting point below about 450° C.

* * * * *

UNITED STATES PATENT AND TRADEMARK OFFICE
CERTIFICATE OF CORRECTION

PATENT NO. : 5,237,038

DATED : August 17, 1993

INVENTOR(S) : John C. Morris, Winston J. Jackson, Jr.

It is certified that error appears in the above-identified patent and that said Letters Patent is hereby corrected as shown below:

Col. 5, line 46 should read as follows:

quinone, about 90 to 10 mol % 4,4'-biphenol, and

Signed and Sealed this

Eighth Day of March, 1994

Attest:

BRUCE LEHMAN

Attesting Officer

Commissioner of Patents and Trademarks